T. C. CARVER.
PEDAL COVER.
APPLICATION FILED JUNE 20, 1919.

1,370,730.
Patented Mar. 8, 1921.

Witness
John W. Tanghe
Hattie Buehler.

Inventor:
Thomas Calvin Carver.

UNITED STATES PATENT OFFICE.

THOMAS CALROW CARVER, OF MILWAUKEE, WISCONSIN.

PEDAL-COVER.

1,370,730.　　　　Specification of Letters Patent.　　Patented Mar. 8, 1921.

Application filed June 20, 1919. Serial No. 305,695.

*To all whom it may concern:*

Be it known that I, THOMAS CALROW CARVER, a British subject, residing at Milwaukee, in the county of Milwaukee and State of Wisconsin, have invented certain new and useful Pedal-Covers, of which the following is a specification.

My invention consists in what is hereinafter particularly set forth with reference to the accompanying drawings and pointed out in the claims of this specification, its object being to provide simple, economical and efficient slip-on, self-gripping and clinging pedal covers; these covers being constructed for retention on pedals without the aid of vacuum adhesion, cement or mechanical appliances. Covers in accordance with my invention are particularly designed for harp and piano pedals to facilitate anti-slip foot contact therewith, as well as to obviate noise incidental to such contact, and to prevent the wear that ordinarily comes upon said pedals and the shoes of persons operating the same.

Each pedal of a harp is prone to wear down to a sharp edge, due to continually recurring foot movement thereon, and when so worn, the pedal is an annoyance to the operator, but such wear is preventable by the employment of a clinging cover in accordance with my invention, each cover being fabricated from members of the same generic material but which differ, one from another in grade and function of stock.

Figure 1:
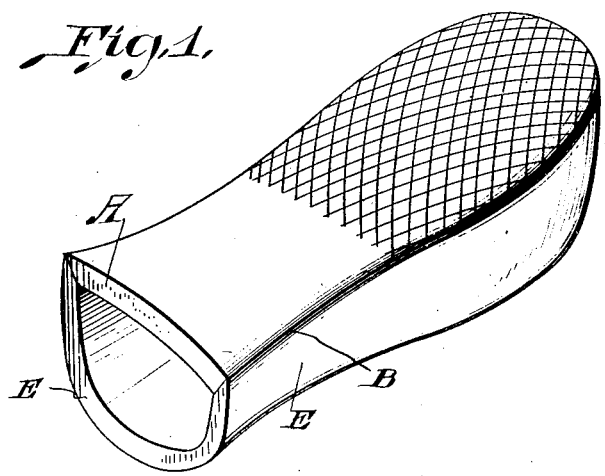
Figure 2:
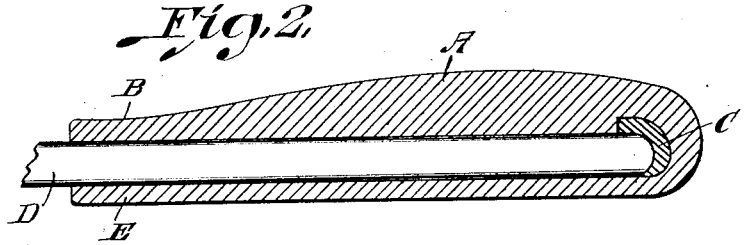

Figure 1 of the drawings represents a perspective view of the pedal cover of my invention, and Fig. 2, a vertical longitudinal section of the cover applied to a pedal.

Referring by letter to the drawings, A indicates relatively a hard tread member of my improved pedal cover, C a reinforced member of the same, and E a readily expansible but automatically contractile grip member of said cover; the device as a whole, being shown as having a constricted neck B by which to facilitate its self-retaining and clinging fit upon a pedal D indicated in Fig. 2. The several members of the cover are of such suitable material, preferably rubber, as will permit of an integral union one with another, such union being had of meeting edges of the tread and grip members of said cover.

The hard member A is preferably thicker, for the most part, than the remainder of the cover, and it may be made of a grade of rubber known to the trade as "tread stock" and sufficiently elastic as to serve as a cushion on the pedal to which said cover is applied. In Fig. 1, the tread member of the cover is shown corrugated, but in practice it may be otherwise roughened or smooth, as preferred.

The reinforce member C of the cover is preferably harder than the tread member A, in which it is set to envelop the outer free end of a pedal to which said cover may be applied. The main function of the reinforce member is to resist wear or cutting action of a pedal on the tread member of the cover, the latter, as a whole, being subjected to push by a foot of the operator of said pedal. The reinforce member of the pedal cover may be omitted without departure from the scope of my invention.

The grip member E of the cover is sufficiently elastic to permit stretching thereof enough to allow a slip-on engagement of said cover, as a whole, with the pedal upon which it has clinging fit and retention of its tread member A in working position incidental to automatic contractile force of said grip member.

From the foregoing it will be understood that my improved pedal cover necessarily involves a hard tread member and an elastic grip member having meeting edges thereof in integral union, and that no extraneous means are requisite for fastening said cover in place, on a pedal, so as to maintain its tread member in working position.

I claim:

1. A fabricated clinging pedal cover whose members are of the same generic material but different as to grade and function of stock, one member being a relatively hard tread and another member a readily expansile automatically contractile pedal-gripper having edges thereof in integral union with said tread.

2. A fabricated clinging pedal cover having a constricted neck and its members of the same generic material though different as to grade and function of stock, one member being a relatively hard tread and another member a readily expansile automatically contractile pedal-gripper having edges thereof in integral union with the tread member.

3. A fabricated pedal cover comprising a relatively hard tread member, a reinforce member arranged in the tread member to envelop the outer free end of a pedal to which the cover is applied and a readily expansile automatically contractile pedal-gripping member having edges thereof in integral union with said tread member, all of the aforesaid members being of the same generic material but different as to grade and function of stock.

THOMAS CALROW CARVER.

Witnesses:
M. E. STROBE,
JOSEPH G. OTTEN.